March 14, 1950 T. E. TORKELSON 2,500,886
PRESSED STEEL CASTER AND METHOD OF MAKING
Filed July 17, 1948

INVENTOR.
TORKEL E. TORKELSON
BY
ATTORNEYS

Patented Mar. 14, 1950

2,500,886

UNITED STATES PATENT OFFICE 2,500,886

PRESSED STEEL CASTER AND METHOD OF MAKING

Torkel E. Torkelson, Baldwin, N. Y., assignor to The Fairbanks Company, New York, N. Y., a corporation of New Jersey Application July 17, 1948, Serial No. 39,285

2 Claims. (Cl. 16—21)

My invention relates to casters and more particularly to a new and novel method for the construction of pressed steel casters incorporating many new and novel structural features.

This application is a continuation in part of my co-pending application, (Serial No. 759,761, filed July 9, 1947, for Pressed steel caster, now abandoned.

Many of the present-day casters are comprised of numerous parts, are expensive to assemble, and utilize king bolts to absorb all of the stress and thrust. Constant use of the caster often results in the shearing of the bolt and necessitating replacement of the caster. Attempts have been made to design ball bearing casters eliminating the king bolt and casters made by welding have been considered by designers. Electric welding, because of its adaptation to production techniques, is very desirable, but in the past electric resistance welding of ball bearing casters has not been feasible because of the passage of the welding current through the ball bearings and the resultant damage to them by pitting and burning caused by the electric arcs occurring during the resistance welding process. If feasible at all, electric welding was considered possible only by insulating the ball bearings during the welding process.

Accordingly, the principal object of my invention is to provide a method of resistance welding pressed steel ball bearing casters which does not require insulating the ball bearings.

Another object of my invention is the design of an improved construction for a swivel caster that will overcome many of the inherent disadvantages of those casters now on the market and which will also be capable of withstanding the shock and stress to which the conventional caster is subjected.

Still another object of my invention is to provide a caster comprising four component parts that are easily and quickly assembled and secured in operative relationship through my method of welding.

Still a further object of my invention is the design of a caster in which the thrust heretofore taken by a king bolt is distributed over a large area of the upper portion of the caster.

Other and further objects of my invention will be apparent from the following description when taken with the accompanying drawings, in which.

Figure 1:
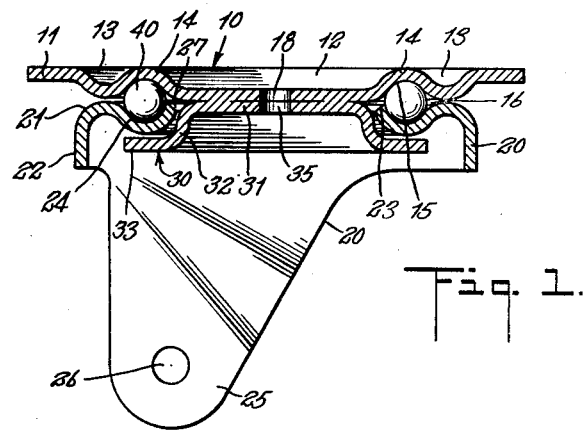
Fig. 1 shows a vertical sectional view through a pressed steel caster constructed in accordance with my invention.

As shown in Fig. 1, my swivel caster 10 comprises four component parts, namely, the top plate 11, the horn 20, the welding cup 30, and the ball bearings 40.

Figure 2:
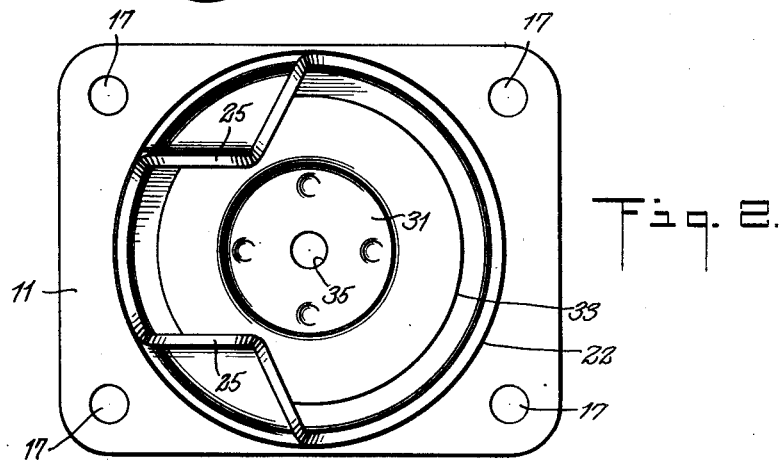
Fig. 2 shows a bottom plan view of the embodiment of Fig. 1.

The top plate 11 is aproximately rectangular in shape, as shown best in Fig. 2, and has a circular dished out center portion 12. Spaced around the outer periphery of the center portion 12 is an annular groove 13. Located between said center portion 12 and said annular groove 13 is an upwardly convex rib 14. The concave or underportion 15 of the rib 14 constitutes the upper half of the ball race 16 for the ball bearings 40. Positioned near the edge at each of the four corners of the top plate 11 are holes 17 through which screws may be inserted to secure the caster 10 to the truck or body that is to be mounted on the caster 10. Located in the center of the top plate 11 is a hole or aperture 18 which is utilized during the assembly operation as a means to position accurately the caster 10, as will be pointed out more fully in connection with the description of Fig. 3.

The horn or load-bearing member 20 has an upper portion that is ring-shaped having a centrally disposed opening 27, an annular shoulder 21, and a downward flange or skirt 22 around its outer periphery. The inner edge 23 of the ring-shaped upper portion is curved upward to form a circular groove 24 between the inner edge 23 and the shoulder 21. Groove 24 acts as the lower half of the ball race 16 for the ball bearings 40. Note that inner edge 23 extends nearly up to center portion 12 of plate 11, thus substantially enclosing the ball bearings 40. Extending downwardly from the upper portion of the horn 20 on two sides are spaced side portions or legs 25 which are provided with holes 26 adjacent their lower extremities through which the shaft supporting the conventional caster roller may be inserted.

The welding cup 30 has the appearance of an inverted dish with a flat circular base 31 and a downwardly extending side 32 that terminates in a horizontal annular flange 33 extending outwardly. Positioned on the base 31 of the cup 30 and integral with the base are a plurality of raised projections 34 (see Figs. 3 and 4). These projections 34 are utilized during the resistance welding of the caster. After the welding is completed, as will be explained more fully in connection with the description of Fig. 3, the portions of the welding cup 30 where the projections 34 are initially formed merge with portions of the opposed face of top plate 11, as shown in Fig. 1. As also there shown, the non-welded portions of base 31 of welding cup 30 and the opposed face of top plate 11 touch one another over their entire surfaces. Note also, as shown in Fig. 1, that preferably there is a small amount of clearance between the upper face of the flange 33 and the bottom face of horn 20 adjacent the groove 24. An even greater clearance is provided between these parts prior to the welding operation, as shown more clearly in Fig. 3, and such clearance is essential to my new method of welding pressed steel casters. Located in the center of the welding cup 30 is a hole or aperture 35, which is of the same dimension as hole 18 and is likewise used solely as a means of positioning the caster during the assembly operation.

Figure 3:
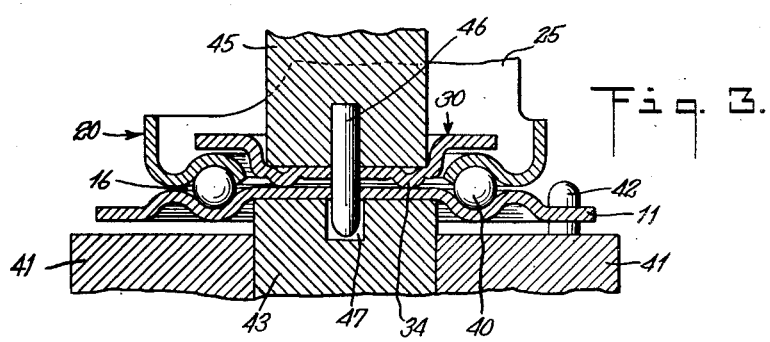
Fig. 3 shows the parts of the embodiment of Fig. 1 in inverted position illustrating the positioning of the parts during the welding operation.

In assembling the caster 10 the top plate 11 is placed in an inverted position, as illustrated in Fig. 3. The assembly operator next takes a handfull of the ball bearings or rotatable anti-friction bearing members 40 and drops them on top of the inverted plate 11. The proper number of bearings are thus positioned in the half 15 of the ball race 16, any excess bearings being swept off the plate by the operator. Next the horn 20 is placed in an inverted position so that the other half 24 of the ball race 16 rests on the ball bearings 40. The welding cup 30 is then placed in inverted position so that its flat circular base 31 extends through the centrally disposed opening 27 in the horn 20.

Figure 4:
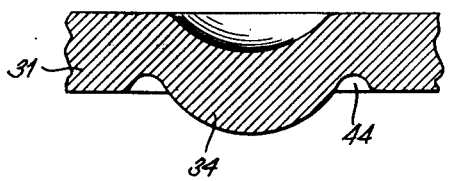
Fig. 4 shows an enlarged sectional view of one of the projections on the welding cup.

Cup 30 is provided with a plurality of projections 34, as shown in Figs. 2 and 3, these projections 34 then resting on the top plate 11 in the manner illustrated in Fig. 3. The preferred shape of these projections 34 is shown in Fig. 4, a recessed groove 44 being formed around each projection 34 at the time these projections are stamped in the welding cup 30, in order to control the circumferential dimension of each projection 34. By making each projection 34 of the same size, equal weld areas are assured from the welding operation.

The assembled unit composed of top plate 11, ball bearings 40, horn 20, and welding cup 30 is next placed on the flat surface of a jig 41 (Fig. 3) on the welding machine. Jig 41 may be provided with one or more spindles 42 positioned to engage holes 17 and thus align roughly the plate 11 in position for the welding operation. As shown, the jig 41 surrounds the lower electrode 43 of the welding machine, which electrode is preferably circular in view of the circular center portion 12 of plate 11. The welding operation then takes place, top electrode 45 next being quickly brought down into operating position as shown in Fig. 3. Electrode 45, like electrode 43, is preferably circular in cross section and a centering spindle 46, of dielectric material, is provided in electrode 45 to position accurately the parts of the caster 10 during the welding operation by engaging the holes 18 and 35. The projecting ends of the spindles 42 and 46 are preferably made somewhat pointed as shown in order to assist in the alignment of the parts of the caster on the jig 41 for the welding operation. Recess 47 is provided in the central portion of the face of bottom electrode 43 to allow the insertion of centering spindle 46.

Note particularly that when the parts of the caster 10 are in aligned position prefatory to the actual welding operation, as shown in Fig. 3, there is clearance between all parts of horn 20 and welding cup 30, thus preventing any circuit path by direct contact between these parts, and hence through the ball bearings 40, during the welding cycle. However, during the energization of the welder, the ball bearings 40 are magnetized and tend to be drawn inwardly toward the welding electrodes. This tendency is overcome due to the weight of the horn 20 and the fact that the curved inner edge 23 substantially encloses the ball bearings 40, and the balls are prevented from being drawn in toward the electrodes, thus preventing also any possibility of a circuit path directly through the balls.

Thus, by the combination of initially spacing the parts of the caster 10 to avoid electrical contact between the welding cup 30 and the horn 20, and then preventing the ball bearings 40 from being attracted to and contacting the welding cup 30, any arcing at, and hence damaging by burning and pitting of, the ball bearings 40 and the surfaces 15 and 24 of the ball race 16 are prevented.

The preferred type of welding which I use is known as resistance projection welding. During the welding operation, the current is applied to the electrodes 43 and 45 for approximately 15 cycles, e. g., one-quarter of a second, high pressure then being applied immediately by forcing the electrodes 43 and 45 together to finish the weld. The entire welding operation itself is very short, taking less than a second, and better than sixty casters a minute can be produced with a single projection welding machine.

It is to be noted that in the preferred form of a caster constructed according to my invention four projections 34 spaced equi-distant from the center of the welding cup and 90° apart are provided, as shown best in Fig. 2. However, casters according to my invention and the method of making these are not limited to such a projection arrangement. Good results have been obtained with a single projection in the form of a ring, a cross-sectional view of which would also appear as in Fig. 3.

Note particularly the relative arrangement of the projections 34 and the ball bearings 40. By positioning the locus of the projections 34 as shown inside the ball race 16, the tendency for the ball bearings 40 to be attracted towards the welding electrodes appears to be materially reduced.

Several further advantages are obtained by positioning the locus of the projections 34 as shown. By spacing the welded areas as shown away from the edges of the hole 35, continuous closely spaced opposed faces of the members 11 and 30 are provided adjacent and surrounding the welded areas. Thus, when the caster is subjected to stress and strain during the time it is in use, the stress adjacent the weld is more like that of a continuous beam rather than a cantilever, as would be the case if the weld areas were merely immediately around the edges of the hole 35.

Another advantage is gained in that the force tending to pull members 10 and 30 apart is distributed over the plurality of welded areas rather than concentrated at the center, as would be the case if a king bolt were used. Note also that by spacing the welded areas immediately adjacent the ball race, rather than adjacent the center of the caster, the lever arm of the force acting on the welded area furthest from the pivot point of the force couples is greater than the lever arm to the center, where a king bolt would be positioned. Thus, the force required to hold the members 10 and 30 together is not as great even for this single welded area furthest from the pivot point, and in addition, the total force acting to pull apart the caster is spread over the plurality of welded areas. It has been found that the weld areas produced according to my method are stronger than the metal of the caster itself, and this fact, coupled with force lever arms greater than those of the prior art, results in my caster being exceptionally strong.

The lever arms of the forces acting on the caster 10 may be approximately measured and expressed as a ratio as follows. In the preferred form of the invention shown in Fig. 1, it will be noted that the perpendicular distance from the center of the axis through the holes 26 for the caster roller to the nearest ball bearing (e. g., the left-hand ball bearing 40) and the distance from the same ball bearing to the area of the weld of the plate member 11 and cup member 30 furthest therefrom (e. g., the weld area adjacent the right-hand ball bearing 40) are in the ratio of three to four. For best results this ratio should be at least two to three.

In its preferred form it is contemplated to use pressed steel with the component parts of the caster being cold formed by a mechanical press. However, if desired, other suitable means to form the component parts of the caster may be utilized.

While the invention has been described in detail with respect to a present preferred form which it may assume, it is not to be limited to such details and form since many changes and modifications may be made in the invention without departing from the spirit and scope of the invention in its broadest aspects. Hence, it is desired to cover any and all forms and modifications of the invention which may come within the language or scope of any one or more of the appended claims.

What I claim is:

1. A method of making a caster having a load-carrying ball bearing by resistance welding without injury to said bearing during said welding, which method comprises the steps of confining the balls of the ball bearing between an annular ball race in a plate member and an annular ball race in a horn member having an aperture therein surrounded by said ball race and exerting pressure on the balls of said ball bearing against said plate member which restrains lateral movement of said balls confined between said ball races normally with respect to said ball races, disposing in contact with said plate member and within said aperture in said horn member a cup-shaped member which has an annular flange substantially lapping and substantially spaced from said annular ball race in said horn member and which has an inner portion provided with spacing means that projects from the surface thereof opposed to said plate member and contacts said plate member in substantially spaced relation to said ball race in said plate member, that determines the position of said annular flange so as to be spaced as aforesaid from said ball race of said horn member and that provides electric contact between said cup member and said plate member solely where said spacing means contacts said plate member, contacting said cup member and said plate member respectively with opposed electrodes, effecting discharge of electric current between said electrodes through said cup member and said plate member where said spacing means contacts said plate member to heat to welding temperature the metal of said members in the zones thereof where said spacing means contacts said plate member, and then pressing said cup member and said plate member together between said electrodes after discontinuing said discharge of electric current to weld said members together and to bring said flange portion of said cup member into closer proximity to said ball race of said horn member for permanently assembling said horn member and said plate member with said balls therebetween, said balls being restrained from movement under the influence of the magnetic action of said discharge of electric current by the aforesaid confinement thereof in said ball races under the pressure of said horn member exerted thereon against said plate member so as to be maintained in position removed from the locus of the flow of electric current during said discharge thereof and thereby protected from injury.

2. A ball bearing caster comprising a plurality of ball bearings, a plate member, a horn member and a cup member, said plate member and said horn member having complementary annular depressions forming a ball race for said ball bearings between said plate member and said horn member, said horn member having a substantially circular aperture therein within and immediately adjacent the inner margin of said annular depression therein, said cup member having an annular flange portion clearing said horn member and underlying said annular depression in said horn member, said plate member and said cup member having centrally disposed disk-shaped portions presenting opposed flat surfaces extending from adjacent the centers thereof to immediately adjacent relation with the inner margin of said annular depression in said plate member, and said opposed surfaces being welded together face-to-face immediately adjacent and along said inner margin of said depression in said plate member.

TORKEL E. TORKELSON.

REFERENCES CITED

The following references are of record in the file of this patent:

UNITED STATES PATENTS

| Number | Name | Date |
|---|---|---|
| 828,033 | Lachman | Aug. 7, 1906 |
| 904,540 | Lachman | Nov. 24, 1908 |
| 1,602,631 | White | Oct. 12, 1936 |
| 1,815,062 | Herold | July 21, 1931 |
| 2,315,357 | Smith | Mar. 30, 1943 |